July 16, 1935.　　　A. ENOS　　　2,008,008

CLICK DOORLOCK

Filed Nov. 9, 1933　　　2 Sheets-Sheet 1

ALEXANDER ENOS.
INVENTOR

BY W. H. Young.
ATTORNEY

July 16, 1935. A. ENOS 2,008,008
CLICK DOORLOCK
Filed Nov. 9, 1933 2 Sheets-Sheet 2

ALEXANDER ENOS.
INVENTOR
BY *W.H.Young*
ATTORNEY

Patented July 16, 1935

2,008,008

UNITED STATES PATENT OFFICE 2,008,008

CLICK DOORLOCK

Alexander Enos, New York, N. Y.

Application November 9, 1933, Serial No. 697,290

6 Claims. (Cl. 70—53)

The invention pertains to a keyless door lock operating on the principle of a combination lock employing a clicking element functioning as a signal sensitive to touch and at the same time audible. The design illustrated shows the lock adapted for use on an automobile door but its use is not limited to this purpose alone, but may be universally employed on safes, strong boxes, cabinet drawers and all types of cabinet structures, as well as automobile transmissions, ignitions, tire carriers, etc.

The main object of my invention is to provide a lock of this type which may be operated without the use of a visual dial, the combination counts being detected mainly by the sense of touch and secondarily by a low audible click.

A further object of my invention is to provide a lock of sturdy construction employing a strong cylindrical housing connected to the panel of the door, in which the locking rings are mounted on the operating bar.

A further object of my invention is the feature of permitting free rotary motion to the handle in place of the usual restricted rotation to a limited segment wherein any rotation beyond the stop or limited segment would force the lock or break it.

A further object of my invention is that the starting point of the combination is not at a fixed position of the door handle. The starting point in my lock may shift with a variable rotation of the locking rings and the new position determined by the sense of touch each time the lock is to be opened.

A further object of my invention is a combination lock employing radial slots on the face of locking rings to prevent picking of the lock, whereby a person without knowledge of the combination could not determine the same either by the sense of touch or audibility.

A further object of my invention is to provide a click door lock of such size and design adapted to replace any standard automobile door lock, without necessitating the reboring or cutting away of the door proper, and at the same time provide a means of assembly of the click door lock which cannot be disassembled from the outer side of the said door.

A further object of my invention is to provide a lock of this character which is strong and durable and yet at the same time, simple in construction and inexpensive to manufacture.

Briefly my invention comprises an operating bar attached to the handle of the door, on which bar are journaled a plurality of locking rings contained in a permanent housing; attached to the operating bar is a clutch which permits the actuation of the bolt by the door handle through a conventional linkage when the combination has been correctly operated. A description of my invention is given in the following paragraphs in conjunction with reference to the accompanying illustrations.

Figure 7 being designated as the end collar, Figure 8, the locking ring Figure 9 the spacing collar, Figure 10 the separater washer and Figure 11, an internal annular rack, as the click collar.

Figure 3:
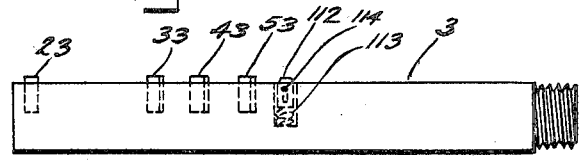
Figure 3 shows an elevation of the operation bar and Figure 4 is a plan view of the same.
Figure 4:
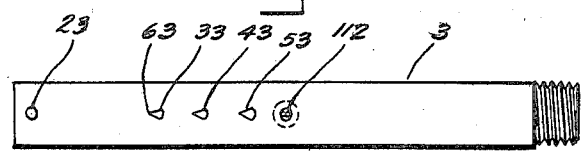

A disclosure of the details of the parts illustrated and the functions thereof, follows:

The operating bar shown in Figures 3 and 4 is of a fixed length for all locks but in adapting the lock to different sized automobile doors, a conventional linkage or bar is inserted between the operating bar 3 and the door handle 2 in cases of doors of greater thickness than the bar itself will span.

Figure 6:
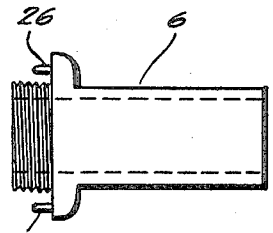
Figure 6 represents the cylindrical housing ferrule.

In assembling the lock on a door, either as an original manufacture or a replacement lock, the locking mechanism, including the cylindrical housing and operating bar are inserted from the back or inside of the door, into the standard bore of the door and screwed onto the ferrule (Fig. 6) thus drawing the ferrule and cylindrical housing together against the door body 46, so that the ferrule pins 26 will enter the holes 36 in the body 46, thus preventing the ferrule from being unscrewed from the outside of the door.

Figure 2:
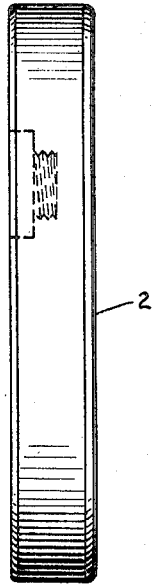
Figure 2 illustrates the door handle.
Figure 15:
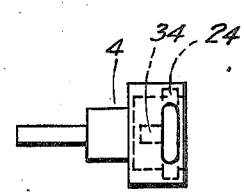
Figures 14 and 15 are side elevations of the clutch, showing the same in cross section.
Figure 14:
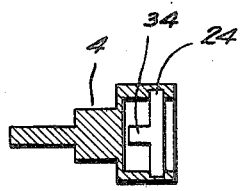

The door handle shown in Figure 2 is fastened to the operating bar (Fig. 3), which has a longitudinal play of approximately one-eighth of an inch. When the locking device is in a closed position, the pin 23 in the operating bar (Figs. 3 and 4) will be positioned in the annular recess 24 of the clutch (Figs. 14 and 15) thus allowing a rotary motion to the operating bar and door handle, free of the clutch. When the locking device is in an open position, a slight pressure on the door handle moves the operating bar further into the clutch so that the pin 23 moves out of the annular recess 24 and into the axile slot 34 in the clutch. When the pin 23 is thus located in the axile slot 34, any circular motion imparted to the door handle will be transmitted to the clutch and in turn through the conventional linkage operate the bolt 44. The said pin 23 (Fig. 3) located in bar 3 is removable; an opening in the side of the clutch 4 coincident with groove 24 is provided for the sole purpose of inserting or removing pin 23 from bar 3 when the clutch 4 and bar 3 are assembled in their normal operating position.

Figure 1:
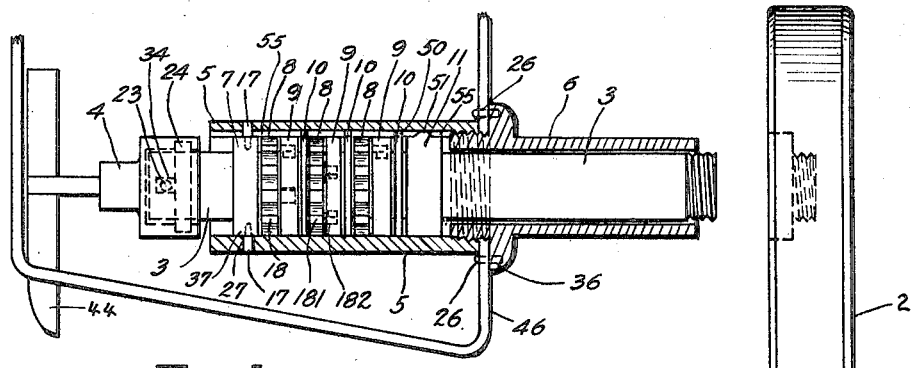
Figure 1 is a sectional view of a door equipped with a lock disclosed in this application.
Figure 5:
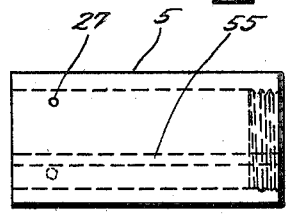
Figure 5 is an illustration of the cylindrical housing in which the locking mechanism is contained.

The locking device, designed to hold the operating bar 3 from engaging with the clutch 4 until the combination has been properly operated, is comprised of the collars and locking rings illustrated in Figures 7 to 11 inclusive; the operating bar 3 is journaled in these collars and rings which are located in the housing 5 (in Fig. 5) and in their respective order as shown in Fig. 1. It should be observed before proceeding to the description of the detailed locking device, that the parts 8, 9 and 10 designated as the locking ring, spacing collar and separator washer (Figs. 8, 9 and 10) constitute a set which are duplicated, triplicated, etc., according to the number of digits desired in the combination. In the lock as illustrated a three digit combination is employed and by referring to Fig. 1 it will be observed that parts 8, 9 and 10 appear three times therein.

Figure 7:
Figures 7 to 11 represent the locking mechanism.
Figure 8:
Figure 12:
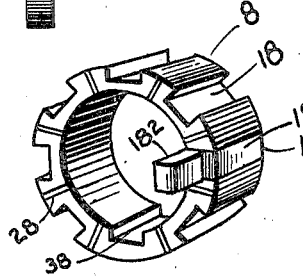
Figure 12 is a perspective view of the locking ring illustrated in Figure 8, on an enlarged scale.

Fig. 7 illustrates the end collar 7 which is fastened rigidly to the housing 5 by means of pins 17 driven through holes 27, in said housing (Fig. 5) and terminating in the indentions 37 of the collar 7. Adjacent to the end collar 7 is located a locking ring 8 as shown in Fig. 1; on the periphery of each locking ring, Figs. 8 and 12 are located a plurality of rectangular axile slots 18 designed to retain the angular blocks illustrated in Fig. 13; leg 181 of the block lying flush with the periphery in slot 18 and the arm 182 projecting beyond the face of the locking ring and in position so as to contact with pins 33, 43 or 53 of the operating bar 3, when the latter is rotated. On the internal bore of each locking ring a rectangular, axial slot 38 is located and designed to admit pins 33, 43 and 53. On the face of each locking ring a plurality of radial notches are located as illustrated in Fig. 12 by 28; the pins 33, 43 and 53 are designed with a pointed nose 63 to engage in these notches when axial pressure is brought against the handle during the operation of the combination, thus causing a dead-lock when an attempt is made to find the combination through manipulation by a stranger thereto.

Figure 9:
Figure 10:
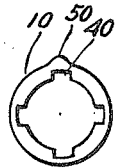

The spacing collar shown in Fig. 9 and the separator in Fig. 10 are designed to permit free operation to the locking ring during the circular motion imparted to the locking ring when the combination is being operated. The spacing collar 9 floats between the face of the locking ring 8 and the separator 10 as shown in Fig. 1 and prevents the angular blocks (Fig. 13), which are attached to the locking ring 8 from contacting with the face of the separator 10. The separator 10 is located between the spacing collar 9 and the back face of the locking ring 8 as shown in Fig. 1 its purpose being to prevent the circular motion of one locking ring being communicated to the next locking ring, thus making it impossible to rotate the locking rings except by rotation of the pins 33, 43 and 53 of the operating bar. The spacing collar 9 is free to revolve but the separator 10 is stationary and held from revolving by the lip 50 riding in the longitudinal groove 55 located on internal bore of the housing 5. The rectangular notches 40 located on the internal bore of the separator washer 10 are merely used for the purpose of assembly of the lock; the rings and collars are first assembled in their proper order in the housing 5 and then the operating bar 3 is inserted after alignment of the grooves 38 in the locking rings 8 and the notches 40 of the separator washer 10; four notches are employed in the separator washer 10 thereby obtaining four positions of the locking ring grooves 38 at which the operating bar pins 33, 43 and 53 will enter the entire assembly free of obstruction.

Figure 11:
Figure 16:
Figures 16 ot 20 are side elevations of the parts illustrated in Figures 7 to 11 respectively.
Figure 17:
Figure 18:
Figure 19:
Figure 20:
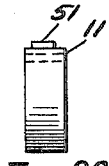

Figure 11 illustrates the click collar which is located in the housing and kept from revolving therein by means of the pin 51 (Fig. 11) riding in groove 55 on the internal bore of the housing 5. The inner bore of the click collar is cut forming an annular rack 111 which engages with the detent 112 shown in Fig. 3; the detent 112 is backed by a coil spring 113 exerting a pressure radially outward on the detent 112 which is held in position by pin 114, driven through the operating bar 3 and a recess in the detent 112 (Fig. 3).

Figure 13:
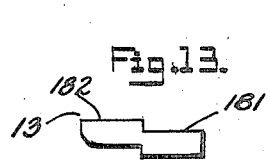
Figure 13 is the locking ring angular block; it is also shown in the perspective in Figure 12.

Figure 13 illustrates an angular, locking ring block; two of such blocks are placed in any desired slots 18 of each locking ring 8 (see 13 in Fig. 12) with the exception of the first locking ring (the one nearest the door handle) in which only one angular locking ring block is employed, in accordance with the combination desired. As described above, when the operating bar 3 is revolved the pins 33, 43 and 53 contact with the arm 182 of the locking ring block (see Figures 12 and 13) thus rotating the locking rings. By operating the door handle the correct number of clicks as counted by means of the detent 112 contacting with the teeth of the annular rack 111, the slots 38 in the locking rings are brought into a straight line and while in this position the pins 33, 43 and 53 on the operating bar will enter the slots 38 by a slight pressure on the door handle thus moving the pin 23 of the operating bar (Fig. 3) out of the annular recess 24 (Figures 14 and 15) and into the axile slot 34 of the clutch 4, thus allowing the operating bar 3 to engage with the bolt 44 by means of the clutch 4 and conventional linkage.

My invention however is not confined to the use of the angular blocks alone in the locking rings, but may employ pins inserted axially in the face of the locking rings as described in my Letters Patent No. 1,890,806 under the title of Click lock.

The general operation of the lock is as follows:

The party operating the combination revolves the door handle any number of turns in one direction; at any point at which the handle is stopped in its circular motion, the locking rings and the axile slots therein will be at the starting position of such combination. The door handle is then revolved in the opposite direction through a given arc designated by the clicks of the combination imparted by the detent and click ring; when a certain number of clicks has been counted, the rotation is reversed the clicks in the second digit of the combination are counted and by repeating the process the last number in a three digit combination is obtained. At this point, providing the combination has been properly operated, the axile slots 38 of the three locking rings 8 (Figs. 8 and 12) will be in alignment, and permit the three pins 33, 43 and 53 of the operating bar 3 (Figs. 3 and 13) to enter said axile slots 38 (made possible by the longitudinal or end play in the bar) by a slight axile pressure on the handle and operating bar, toward the rear of the door. This axile motion imparted to the operating bar 3, allows pin 23 (Fig. 3) to move out of the annular recess 24 of the clutch 4 (Figs. 14 and 15) and drop into the axile slot 34; (a slight rotation of the door handle and operating bar being necessary to allow the pin 23 to find the slot 34). When the pin 23 is thus located in slot 34 the linkage between the door handle and the bolt is in engagement for opening the door.

What I claim is:

1. In a lock mechanism, a fixed cylindrical housing, a plurality of locking rings journaled on an operating bar within the said housing, an axile slot on the internal bore of each ring, a plurality of pins projecting radially from said bar in axile alinement and adapted to rotate said locking rings and aline said slots, whereby said pins may enter the slots and the operating bar moved longitudinally through the rings to engage a bolt operating member, a plurality of radial notches on the face of each locking ring, the side of each pin on the operating bar adjacent said radial notches being tapered to a chisel edge and adapted to enter said radial notches, substantially as described.

2. In a lock mechanism, a fixed cylindrical housing, a plurality of locking rings journaled on an operating bar within the said housing, an axile slot on the internal bore of each ring, a plurality of pins projecting radially from said bar in axile alinement and adapted to rotate said locking rings and aline said slots, whereby said pins may enter the slots and the operating bar moved longitudinally through the rings to engage a bolt operating member, a plurality of radial notches on the face of each locking ring, the side of each pin on the operating bar adjacent said radial notches being tapered to a chisel edge and adapted to enter said radial notches, a plurality of axile slots on the periphery of said locking rings, an angular block for each ring, having an arm positioned in one of said slots flush with the peripheral surface of the ring, and another arm of said block projecting beyond the face of the ring and into the circular path of travel of one of the pins on the operating bar, substantially as described.

3. In a lock mechanism, a fixed cylindrical housing, a plurality of locking rings journaled on an operating bar within the said housing, an axile slot on the internal bore of each ring, a plurality of pins projecting radially from said bar in axile alinement and adapted to rotate said locking rings and aline said slots, whereby said pins may enter the slots and the operating bar moved longitudinally through the rings to engage a bolt operating member, a plurality of radial notches on the face of each locking ring, the side of each pin on the operating bar adjacent said radial notches being tapered to a chisel edge and adapted to enter said radial notches, a plurality of axile slots on the periphery of said locking rings, an angular block for each ring, having an arm positioned in one of said slots flush with the peripheral surface of the ring, and another arm of said block projecting beyond the face of the ring and into the circular path of travel of one of the pins on the operating bar, a plurality of washers, and a projecting lip on the periphery of each washer adapted to fit an axile groove on the internal bore of the cylindrical housing, a plurality of notches on the internal bore of each washer, the notches of each washer being in alinement with those of the other washers whereby the pins on the operating bar may pass through the said notches and locking ring slots to position the operating bar in the locking mechanism, a plurality of spacing collars free to rotate in the cylindrical housing around the projecting arms of the angular blocks between the locking rings and the washers, substantially as described.

4. In a lock mechanism, a fixed cylindrical housing, a plurality of locking rings journaled on an operating bar within the said housing, an axile slot on the internal bore of each ring, a plurality of pins projecting radially from said bar in axile alinement and adapted to rotate said locking rings and aline said slots, whereby said pins may enter the slots and the operating bar moved longitudinally through the rings to engage a bolt operating member, a plurality of radial notches on the face of each locking ring, the side of each pin on the operating bar adjacent said radial notches being tapered to a chisel edge and adapted to enter said radial notches, a plurality of axile slots on the periphery of said locking rings, an angular block for each ring, having an arm positioned in one of said slots flush with the peripheral surface of the ring, and another arm of said block projecting beyond the face of the ring and into the circular path of travel of one of the pins on the operating bar, a plurality of washers, and a projecting lip on the periphery of each washer adapted to fit an axile groove on the internal bore of the cylindrical housing, a plurality of notches on the internal bore of each washer, the notches of each washer being in alinement with those of the other washers whereby the pins on the operating bar may pass through the said notches and locking ring slots to position the operating bar in the locking mechanism, a plurality of spacing collars free to rotate in the cylindrical housing around the projecting arms of the angular blocks between the locking rings and the washers, an end collar journaled on the operating bar and fixed to the cylindrical housing by pins, substantially as described.

5. In a lock mechanism, a fixed cylindrical housing, a plurality of locking rings journaled on an operating bar within the said housing, an axile slot on the internal bore of each ring, a plurality of pins projecting radially from said bar in axile alinement and adapted to rotate said locking rings and aline said slots, whereby said pins may enter the slots and the operating bar moved longitudinally through the rings to engage a bolt operating member, a plurality of axile slots on the periphery of said locking rings, an angular block for each ring having an arm positioned in one of said slots flush with the peripheral surface of the locking ring, and another arm of said block projecting beyond the face of the ring and into the circular path of travel of one of the pins on the operating bar, substantially as described.

6. In a lock mechanism, a fixed cylindrical housing, a plurality of locking rings journaled on an operating bar within the said housing, an axile slot on the internal bore of each ring, a plurality of pins projecting radially from said bar in axile alinement and adapted to rotate said locking rings and aline said slots, whereby said pins may enter the slots and the operating bar moved longitudinally through the rings to engage a bolt operating member, a plurality of spacing collars free to rotate in the cylindrical housing around the projecting arms of angular blocks located in the locking rings.

ALEXANDER ENOS.